(12) United States Patent
Toyota

(10) Patent No.: US 9,162,665 B2
(45) Date of Patent: Oct. 20, 2015

(54) KICK-DOWN SHIFT CONTROL DEVICE FOR ELECTRIC VEHICLE

(75) Inventor: Ryohey Toyota, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 48 days.

(21) Appl. No.: 13/983,338

(22) PCT Filed: Feb. 1, 2012

(86) PCT No.: PCT/JP2012/052250
§ 371 (c)(1),
(2), (4) Date: Aug. 2, 2013

(87) PCT Pub. No.: WO2012/105601
PCT Pub. Date: Aug. 9, 2012

(65) Prior Publication Data
US 2013/0311027 A1 Nov. 21, 2013

(30) Foreign Application Priority Data
Feb. 4, 2011 (JP) .................................. 2011-022538

(51) Int. Cl.
*B60W 10/11* (2012.01)
*B60W 20/00* (2006.01)
(Continued)

(52) U.S. Cl.
CPC ................ *B60W 10/11* (2013.01); *B60K 6/365* (2013.01); *B60K 6/48* (2013.01); *B60L 11/14* (2013.01); *B60L 15/2054* (2013.01); *B60W 10/06* (2013.01); *B60W 10/08* (2013.01); *B60W 10/115* (2013.01); *B60W 20/108* (2013.01); *B60W 30/18* (2013.01); *B60W 30/19* (2013.01); *B60W 50/06* (2013.01); *F16H 61/061* (2013.01); *F16H 63/502* (2013.01); *B60K 2006/4825* (2013.01);
(Continued)

(58) Field of Classification Search
CPC .. B60L 11/14; B60L 15/2054; B60W 20/108; B60W 10/06; B60W 10/08; B60W 10/11; B60W 10/115; B60W 50/06; B60W 30/18; B60W 30/19; F16H 61/61; F16H 63/502; B60K 6/48; B60K 6/635
USPC .................................. 701/22, 51; 180/65.285
See application file for complete search history.

(56) References Cited

U.S. PATENT DOCUMENTS

2010/0101880 A1* 4/2010 Suzuki et al. ............ 180/65.265
2011/0190991 A1* 8/2011 Araki et al. ..................... 701/58
2012/0109444 A1* 5/2012 Umayahara ..................... 701/22

FOREIGN PATENT DOCUMENTS

JP 5-319144 A 12/1993
JP 2006-316848 A 11/2006
(Continued)

*Primary Examiner* — Fadey Jabr
*Assistant Examiner* — Aaron L Troost
(74) *Attorney, Agent, or Firm* — Foley & Lardner LLP

(57) ABSTRACT

By increasing accelerator opening APO from time t1, kick-down shift is started at time t2. While the kick-down shift is carried out by changeover from a release element to an engagement element, a motor torque tTm that is increased as Tmo with an increase in accelerator opening APO is restricted as follows. In a shift initial stage from time t2 to inertia phase start time t3, motor torque tTm is restricted to not exceed upper limit value Tlimit obtained by subtracting an inertia phase progressing torque increment Tip from an inertia phase end outputtable maximum motor torque Tmo2 that is outputtable with motor rotation speed Nmo2 at inertia phase end time t4. During an inertia phase (t3-t4), the motor torque tTm is restricted to a value Tlimit+Tip.

6 Claims, 5 Drawing Sheets

(51) Int. Cl.
  *B60W 50/06* (2006.01)
  *B60W 10/06* (2006.01)
  *B60W 10/08* (2006.01)
  *B60W 10/115* (2012.01)
  *B60W 30/18* (2012.01)
  *B60W 30/19* (2012.01)
  *B60L 11/14* (2006.01)
  *B60L 15/20* (2006.01)
  *B60K 6/48* (2007.10)
  *F16H 61/06* (2006.01)
  *F16H 63/50* (2006.01)
  *B60K 6/365* (2007.10)
  *F16H 59/20* (2006.01)
  *F16H 61/686* (2006.01)

(52) U.S. Cl.
  CPC ...... *B60W 2540/10* (2013.01); *B60W 2540/103* (2013.01); *B60W 2600/00* (2013.01); *F16H 59/20* (2013.01); *F16H 61/686* (2013.01); *Y02T 10/6221* (2013.01); *Y02T 10/6252* (2013.01); *Y02T 10/6286* (2013.01); *Y02T 10/70* (2013.01); *Y02T 10/7077* (2013.01); *Y02T 10/7275* (2013.01)

(56) References Cited

FOREIGN PATENT DOCUMENTS

| | | |
|---|---|---|
| JP | 2008-168729 A | 7/2008 |
| JP | 2009-292281 A | 12/2009 |
| WO | WO 2011/004488 A1 * | 1/2011 |

* cited by examiner

FIG.2

| TRANSMISSION FRICTION ELEMENT / GEAR STAGE | I/C | H&LR/C | D/C | R/B | Fr/B | FWD/B |
|---|---|---|---|---|---|---|
| FIRST SPEED (FORWARD) | | ○← | | | ○ | ○ |
| SECOND SPEED (FORWARD) | | ○ | ←○ | | ○ | ○ |
| THIRD SPEED (FORWARD) | | ○ | ○ | | ○ | ○ |
| FOURTH SPEED (FORWARD) | ○ | ○ | | | | ○ |
| FIFTH SPEED (FORWARD) | ○ | ○ | | | ○ | ○ |
| REVERSE | | | | ○ | ○ | |

KICK-DOWN SHIFT CONTROL DEVICE FOR ELECTRIC VEHICLE

TECHNICAL FIELD

The present invention relates to a kick-down shift control device for an electric vehicle, for example, an electric automobile using an electric motor solely as a power source and a hybrid vehicle using both an electric motor and an engine (internal combustion engine, etc.) as a power source, and particularly relates to a kick-down shift control device for an electric vehicle adapted to drive wheels through an automatic transmission, which well performs kick-down shift of the automatic transmission during an electric drive (EV drive) using motor torque transmitted from the electric motor.

BACKGROUND ART

Conventionally, an electric automobile as described in Patent Literature 1 is known as an electric vehicle equipped with an automatic transmission as described above.

The electric automobile includes an electric motor solely as a power source and the automatic transmission disposed between the electric motor and driving wheels, and allows the automatic transmission to convert motor torque from the electric motor and transmit the thus converted motor torque toward the driving wheels.

In the automatic transmission, shift from a gear stage (shift stage) as selected to a target gear stage is performed by changeover of transmission friction elements between engagement and release.

Upon carrying out the changeover of transmission friction elements between engagement and release during the shift operation, a predetermined time (shift time) is necessary from start of the shift operation to finish of the shift operation for such a reason that it is required to carry out changeover between a release-side transmission friction element to be switched from an engagement state to a release state and an engagement-side transmission friction element to be switched from a release state to an engagement state.

On the other hand, since a large torque is required upon depressing an accelerator pedal, the automatic transmission is downshifted (kick-down shifted) to a low-side gear ratio. Also, during a shift time in which the downshift is executed, it is necessary to transmit a large torque responding to depression of the accelerator pedal toward the driving wheels.

Further, generally, upon controlling the electric motor, a target motor torque requested by a vehicle driver is determined from motor rotation speed and an amount of depression of an accelerator pedal, and the electric motor is controlled such that the motor torque reaches the target value.

CITATION LIST

Patent Literature

Patent Literature 1: Japanese Patent Application Unexamined Publication No. 05-319144

SUMMARY OF INVENTION

Technical Problem

However, even when the above-described general motor control, that is, such motor control as to attain the target motor torque determined in accordance with the motor rotation speed and the amount of depression of the accelerator pedal, is carried out during the shift time of the kick-down shift, the motor torque controlled at the target value is reduced by an amount of slippage of the transmission friction elements, and therefore, cannot be transmitted toward the driving wheels during the shift time. A whole amount of the motor torque can be directed toward the driving wheels after completion of the kick-down shift at which the transmission friction elements become free from slippage by termination of changeover of the transmission friction elements.

As a result, a desired driving force cannot be obtained by depressing the accelerator pedal by the vehicle driver during the shift time of the kick-down shift. The vehicle driver feels that increase in vehicle acceleration is not as desired, and is not satisfied due to a delayed acceleration response by a time corresponding to the shift time.

In addition, in a case where the motor torque provided by the above-described general motor control is set to a target value in accordance with the motor rotation speed and the amount of depression of the accelerator pedal, the following problem also occurs.

An electric motor usually exhibits such a torque characteristic that as the rotation speed increases, outputtable maximum motor torque becomes lowered. Further, since the above-described downshift is a shift toward a low-side gear ratio, input rotation speed of the automatic transmission is increased as the downshift proceeds (during inertia phase in which a transmission input-output rotation speed ratio is changed from a pre-shift gear ratio toward a post-shift gear ratio).

Such increase in input rotation speed of the automatic transmission means increase in motor rotation speed, so that the outputtable maximum motor torque of the electric motor is lowered due to the increase in rotation speed during the inertia phase.

Accordingly, in a case where the motor torque during the kick-down shift (during the shift time) which is controlled on the basis of the motor rotation speed and the amount of depression of the accelerator pedal, that is, the motor torque increased in response to depression of the accelerator pedal is approximately the outputtable maximum motor torque, a drop of the motor torque (transmission input torque) occasionally occurs as the motor rotation speed is increased with progress of the kick-down shift (during the inertia phase).

Such a drop of the transmission input torque during the kick-down shift (during the inertia phase) not only gives the vehicle driver such a feeling that a desired increase in vehicle acceleration is not attained during drop of the transmission input torque, but also causes a delay in the progress of the kick-down shift (progress of the inertia phase) to thereby prolong the shift time. The vehicle driver is allowed to feel a large delay in acceleration response over the prolonged shift time.

An object of the present invention is provide a kick-down shift device for an electric vehicle capable of realizing a solution of the above-described problems by setting such an upper limit of motor torque as to suppress occurrence of the above-described problems (a drop of the motor torque which is caused along with increase in motor rotation speed during an inertia phase) while maintaining a general motor control method that controls motor torque of an electric motor in accordance with an amount of depression of an accelerator pedal.

Solution to Problem

To achieve the above object, a kick-down shift control device for an electric vehicle according to the present invention is constructed as follows.

First, an electric vehicle as a premise for the present invention is explained. The electric vehicle is so constructed as to be capable of travelling by motor torque inputted from an electric motor through an automatic transmission in accordance with an amount of depression of an accelerator pedal.

The kick-down shift control device according to the present invention includes the following motor torque upper limit value restricting section provided for such an electric vehicle.

Upon kick-down shift toward a low-side gear ratio of the automatic transmission in accordance with depression of the accelerator pedal, the motor torque upper limit value restricting section restricts an upper limit of the motor torque that increases with the depression of the accelerator pedal to a level at which no phenomenon of drop of the motor torque occurs even when rotation speed of the electric motor is increased during the inertia phase in which a ratio of input rotation speed of the automatic transmission and output rotation speed thereof is changed toward the low-side gear ratio.

Effect of Invention

In the above-described kick-down shift control device for an electric vehicle according to the present invention, upon the kick-down shift of the automatic transmission, the upper limit of the motor torque that increases with the depression of the accelerator pedal is restricted to the level at which no phenomenon of drop of the motor torque occurs even when rotation speed of the electric motor is increased during the inertia phase. Therefore, the above-described problems that are caused due to the drop of the motor torque during the inertia phase of the kick-down shift, specifically, the problem that the vehicle driver feels unsatisfactory owing to an undesirable increase in vehicle acceleration, and the problem that a feeling of a large delay of acceleration response is given to the vehicle driver over a long shift time due to a delay of progress of the kick-down shift (progress of inertia phase).

BRIEF DESCRIPTION OF DRAWINGS

FIG. 2 is an engagement logic diagram showing a selected shift stage of an automatic transmission shown in FIG. 1 and a combination of engagement and release of transmission friction elements.

DESCRIPTION OF EMBODIMENTS

In the following, embodiments of the present invention are explained in detail by referring to the accompanying drawings.

<Construction of Embodiments>

Figure 1:
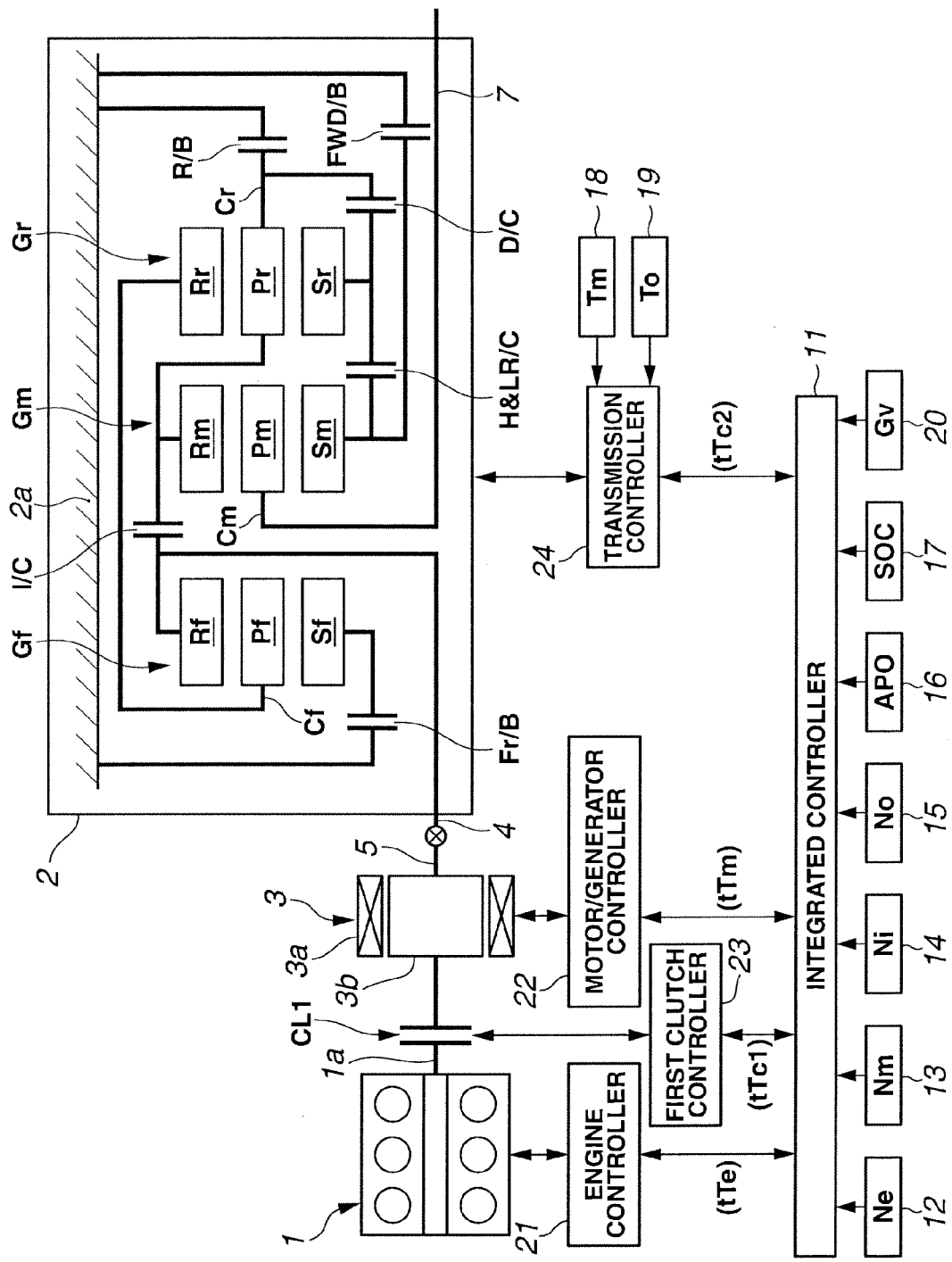
FIG. 1 is a schematic diagram showing a power train of a front-engine rear-wheel drive hybrid vehicle equipped with a hybrid running gear including a kick-down shift device according to an embodiment of the present invention together with a control system thereof.

FIG. 1 shows a power train of a front-engine rear-wheel drive hybrid vehicle equipped with a hybrid running gear including a kick-down shift device according to an embodiment of the present invention together with a control system thereof. Reference numeral 1 denotes an engine serving as one of power sources. Reference numeral 2 denotes an automatic transmission. Reference numeral 3 denotes a motor/generator serving as the other of the power sources.

In the power train of the hybrid vehicle as shown in FIG. 1, similarly to a conventional rear wheel drive vehicle, automatic transmission 2 is disposed rearward of engine 1 in a vehicle forward-and-rearward direction in tandem with engine 1, and motor/generator 3 is coupled to shaft 5 through which rotation from engine 1 (specifically, crankshaft 1a) is transmitted to input shaft 4 of automatic transmission 2.

Motor/generator 3 includes annular stator 3a fixedly disposed within a housing, and rotor 3b concentrically disposed within stator 3a with a predetermined air gap. Motor/generator 3 acts as a motor (electric motor) or a generator (dynamo-electric generator) depending on an operating condition demanded.

Motor/generator 3 is disposed between engine 1 and automatic transmission 2.

Motor/generator 3 is connected to the above-described shaft 5 extending through a center of rotor 3b, and utilizes shaft 5 as a motor/generator shaft.

Disposed between motor/generator 3 and engine 1, specifically, between motor/generator shaft 5 and engine crankshaft 1a is first clutch CL1 through which engine 1 and motor/generator 3 are disconnectably coupled to each other. First clutch CL1 is constructed to continuously vary a transmission torque capacity. For instance, first clutch CL1 is constituted of a wet multiple disc clutch that can vary a transmission torque capacity by continuously controlling a flow rate of clutch working oil and a clutch working oil pressure using a proportional solenoid.

Motor/generator 3 and automatic transmission 2 are directly connected with each other through direct coupling between motor/generator shaft 5 and transmission input shaft 4.

Automatic transmission 2 includes a transmission mechanism section similar to that of a well-known planetary gear automatic transmission, but excludes a torque converter therefrom. Instead of the torque converter, motor/generator 3 is directly connected to transmission input shaft 4.

Automatic transmission 2 is schematically explained as follows.

Automatic transmission 2 includes output shaft 7 arranged in coaxial and abutting relation to input shaft 4.

Front planetary gear set Gf, center planetary gear set Gm, and rear planetary gear set Gr are mounted on these input shaft 4 and output shaft 7 in sequence from the side of engine 1 (motor/generator 3). These planetary gear sets constitute main elements of a planetary gear transmission mechanism in automatic transmission 2.

Front planetary gear set Gf located in the closest position relative to engine 1 (motor/generator 3) is a simple planetary gear set constituted of front sun gear Sf, front ring gear Rf, front pinion Pf that meshes these front sun gear Sf and front ring gear Rf, and front carrier Cf through which the front pinion Pf is rotatably supported. Center planetary gear set Gm located in the second closest position relative to engine 1 (motor/generator 3) following front planetary gear set Gf is a simple planetary gear set constituted of center sun gear Sm, center ring gear Rm, center pinion Pm that meshes these center sun gear Sm and center ring gear Rm, and center carrier Cm through which the center pinion Pm is rotatably supported.

Rear planetary gear set Gr located in the farthest spaced position relative to engine 1 (motor/generator 3) is a simple planetary gear set constituted of rear sun gear Sr, rear ring gear Rr, rear pinion Pr that meshes these rear sun gear Sr and rear ring gear Rr, and rear carrier Cr through which the rear pinion Pr is rotatably supported.

Front brake Fr/B, input clutch I/C, high and low reverse clutch H&LR/C, direct clutch D/C, reverse brake R/B and forward brake FWD/B are provided as transmission friction elements which determine a transmission path (gear stage) of the planetary gear transmission mechanism. These transmission friction elements constitute the planetary gear transmission mechanism of automatic transmission 2 in association with the above-described elements of the planetary gear sets Gf, Gm, Gr.

Front ring gear Rf is coupled to input shaft 4. Center ring gear Rm is connectable to input shaft 4 through input clutch I/C as appropriate.

Front sun gear Sf is fixable to transmission case 2a through front brake Fr/B as appropriate.

Front carrier Cf and rear ring gear Rr are coupled to each other. Center ring gear Rm and rear carrier Cr are coupled to each other.

Center carrier Cm is coupled to output shaft 7. Center sun gear Sm and rear sun gear Sr are connectable to each other through high and low reverse clutch H&LR/C.

Rear sun gear Sr and rear carrier Cr are connectable to each other through direct clutch D/C. Rear carrier Cr is fixable to transmission case 2a through reverse brake R/B as appropriate.

Center sun gear Sm is also fixable to transmission case 2a through forward brake FWD/B as appropriate.

A power transmission train of the above-described planetary gear transmission mechanism includes forward gear stages including a first forward speed, a second forward speed, a third forward speed, a fourth forward speed and a fifth forward speed, and a reverse gear stage. These gear stages are attained by selectively engaging six transmission friction elements Fr/B, I/C, H&LR/C, D/C, R/B, FWD/B as indicated by circles in FIG. 2.

Meanwhile, the above-described hybrid vehicle equipped with the power train that includes engine 1, motor/generator 3 and automatic transmission 2 as shown in FIG. 1 requires a second clutch through which motor/generator 3 and the drive wheels coupled to transmission output shaft 7 are separably coupled to each other. However, this embodiment does not adopt a construction in which the second clutch is additionally disposed forward or rearward of automatic transmission 2. Instead of the construction, in this embodiment, the transmission friction element selected from the above-described six transmission friction elements Fr/B, I/C, H&LR/C, D/C, R/B, FWD/B as explained later is used as the second clutch.

A function in each of selected modes in the above-described power train will be explained hereinafter by referring to FIG. 1.

In the power train as shown in FIG. 1, in a case where there is made a request for an electric drive (EV drive) mode that is used in a low load and low vehicle speed condition including a start time at which the vehicle is started from a stop state, first clutch CL1 is brought into a release state, and automatic transmission 2 is brought into a power transmission state in which a predetermined gear stage is selected.

When motor/generator 3 is driven in this state, only rotation outputted from motor/generator 3 is transmitted to transmission input shaft 4. Automatic transmission 2 changes the rotation inputted to transmission input shaft 4 in accordance with the gear stage being selected, and outputs the changed rotation from transmission output shaft 7. The rotation outputted from transmission output shaft 7 is then transmitted to left and right drive wheels through a differential gear (not shown), so that the electric drive (EV drive) of the vehicle can be performed by only motor/generator 3 (EV mode).

In a case where there is made a request for a hybrid drive mode (HEV mode) that is used, for example, during a high speed travelling, during a large load travelling, or when a suppliable electric power of a battery is low, first clutch CL1 is brought into an engagement state, and at the same time, automatic transmission 2 is brought into a power transmission state in which a predetermined gear stage is selected.

In this state, the rotation outputted from engine 1, or both the rotation outputted from engine 1 and the rotation outputted from motor/generator 3 are transmitted to transmission input shaft 4. Automatic transmission 2 changes the rotation inputted to transmission input shaft 4 in accordance with the gear stage being selected, and outputs the changed rotation from transmission output shaft 7.

The rotation outputted from transmission output shaft 7 is then transmitted to the left and right drive wheels through the differential gear (not shown), so that the hybrid drive (HEV drive) of the vehicle can be performed by both engine 1 and motor/generator 3 (HEV mode).

In a case where a surplus of energy occurs when engine 1 is operated with optimal fuel consumption during such HEV drive, the surplus energy is converted into electric power by operating motor/generator 3 as a generator using the surplus energy, and the electric power generated is stored for use for motor drive of motor/generator 3. As a result, fuel economy of engine 1 can be enhanced.

The transmission friction element among the six transmission friction elements Fr/B, I/C, H&LR/C, D/C, R/B, FWD/B in automatic transmission 2 which is used as the second clutch is explained below.

It is necessary for the second clutch to carry out a transmission torque capacity lowering control (slip control) in order to reduce a start shock upon starting the engine. In addition, a request for engine start is made as the EV mode is changed to the HEV mode at the time at which engine load is increased, so that downshift of the automatic transmission in response to increase in engine load tends to occasionally occur.

Therefore, it is determined which one among the transmission friction elements Fr/B, I/C, H&LR/C, D/C, R/B, FWD/B is used as the second clutch in connection with the presence or absence of the downshift and an accelerator operation by a vehicle driver which is representative of engine load.

Specifically, in a case where downshift of automatic transmission 2 is requested upon changing from the EV mode to the HEV mode (at the engine start time), or in a case where an accelerator operation that will make the downshift request is carried out, a transmission torque capacity of a release-side transmission friction element to be changed from an engagement state to a release state upon downshift is lowered during the downshift. Therefore, the release-side transmission friction element is used as the second clutch, and the release-side transmission friction element (the second clutch) is allowed to slip by executing the transmission torque capacity lowering control, thereby serving for reducing the engine start shock.

In a case where no downshift of automatic transmission 2 is requested at the engine start time, or in a case where an accelerator operation that will not make the downshift request is carried out, a transmission friction element having a largest effect of input torque variation cutoff among the transmission friction elements used for selecting the current gear stage (the transmission friction elements indicated by circles each gear stage as shown in FIG. 2) is used as the second clutch.

The release-side transmission friction element (the second clutch) is allowed to slip by executing the transmission torque capacity lowering control, thereby serving for reducing the engine start shock.

For this purpose, a rate of input torque variation cutoff of the respective transmission friction elements Fr/B, I/C, H&LR/C, D/C, R/B, FWD/B in automatic transmission 2 (a rate of cutoff of automatic transmission input torque variation which can be performed by slipping the transmission friction elements by the transmission torque capacity lowering control) is previously determined each gear stage. Further, the transmission friction element having the highest rate of input torque variation cutoff among the transmission friction elements used for selecting the current gear stage is used as the second clutch. The transmission friction element having the highest rate of input torque variation cutoff is allowed to slip by executing the transmission torque capacity lowering control, thereby serving for reducing the engine start shock.

Meanwhile, the transmission friction element present in automatic transmission 2 which is used as the second clutch is inherently capable of continuously changing the transmission torque capacity as well as first clutch CL1.

Next, a control system of engine 1, motor/generator 3 and first clutch CL1 which constitute the power train of the above-described hybrid vehicle, and the second clutch (hereinafter referred to as CL2) in automatic transmission 2 which is selectively used as described above is generally explained by referring to FIG. 1.

The control system includes integrated controller 11 that executes integrated control of an operating point of the power train, and determines the operating point of the power train based on target engine torque tTe, target motor/generator torque tTm, target transmission torque capacity tTc1 of first clutch CL1, and target transmission torque capacity tTc2 of second clutch CL2.

In order to determine the operating point of the power train, the following signals are inputted to integrated controller 11: a signal from engine rotation sensor 12 that detects the rotation speed Ne of engine 1, a signal from motor/generator rotation sensor 13 that detects the rotation speed Nm of motor/generator 3, a signal from input rotation speed sensor 14 that detects the transmission input rotation speed Ni, a signal from output rotation speed sensor 15 that detects the transmission output rotation speed No (vehicle speed), a signal from accelerator opening sensor 16 that detects an amount of accelerator pedal depression (accelerator opening APO), a signal from a state-of-charge sensor 17 that detects a state of charge SOC (suppliable electric power) of a battery (not shown) that stores an electric power for motor/generator 3, and a signal from longitudinal acceleration sensor 20 that detects longitudinal acceleration Gv of the vehicle.

Integrated controller 11 selects an operation mode (EV mode, HEV mode) in which a vehicle driving force demanded by the vehicle driver can be realized, on the basis of the accelerator opening APO, the state of charge SOC of the battery, the transmission output rotation speed No (vehicle speed) from the above-described input information. Integrated controller 11 also calculates the target engine torque tTe, the target motor/generator torque tTm, the target transmission torque capacity tTc1 of first clutch CL1, and the target transmission torque capacity tTc2 of second clutch CL2.

The target engine torque tTe is supplied to engine controller 21. Engine controller 21 controls engine 1 such that engine torque conforms to the target engine torque tTe by executing throttle opening control, fuel injection amount control, etc. for realizing the target engine torque tTe based on the engine rotation speed Ne detected by sensor 12 and the target engine torque tTe.

The target motor/generator torque tTm is supplied to motor/generator controller 22. Motor/generator controller 22 performs DC-AC conversion of an electric power of the battery by an inverter (not shown). Further, motor/generator controller 22 supplies the converted AC current to stator 3a of motor/generator 3 under control of the inverter, and controls motor/generator such that motor/generator torque conforms to the target motor/generator torque tTm.

The target motor/generator torque tTm is to be determined in accordance with the engine rotation speed Ne detected by sensor 12 and the accelerator opening APO detected by sensor 16 during the above-described EV drive.

Further, in a case where the target motor/generator torque tTm requests motor/generator 3 to perform a regenerative brake function, motor/generator controller 22 provides such a power generation load as not to cause overcharge of the battery through the inverter in connection with the state of charge SOC of the battery (outputtable electric power) detected by sensor 17, and performs AC-DC conversion of an electric power generated by motor/generator 3 having the regenerative brake function.

The first clutch target transmission torque capacity tTc1 is supplied to first clutch controller 23. First clutch controller 23 controls an engagement pressure of first clutch CL1 such that an actual engagement pressure of first clutch CL1 conforms to a first clutch engagement pressure command value corresponding to the first clutch target transmission torque capacity tTc1 by comparison between the first clutch engagement pressure command value and the actual engagement pressure of first clutch CL1, and executes control to conform the transmission torque capacity of first clutch CL1 to the target value tTc1.

The second clutch target transmission torque capacity tTc2 is supplied to transmission controller 24. Transmission controller 24 controls an engagement pressure of second clutch CL2 such that an actual engagement pressure Pc2 of second clutch CL2 conforms to a second clutch engagement pressure command value corresponding to the second clutch target transmission torque capacity tTc2 by comparison between the second clutch engagement pressure command value and the actual engagement pressure of second clutch CL2, and executes control to conform the transmission torque capacity of second clutch CL2 to the target value tTc2.

In addition, transmission controller 24 basically determines a gear stage suitable for the current vehicle operating condition from a predetermined shift map on the basis of the transmission output rotation speed No (vehicle speed) detected by sensor 15 and the accelerator opening APO detected by sensor 16, and allows automatic transmission 2 to automatically shift so as to select the suitable gear state.

Further, upon performing the automatic shift, transmission controller 24 executes well-known shift shock reduction control based on a signal from motor torque sensor 18 that detects motor torque Tm of motor/generator 3, and a signal from transmission output torque sensor 19 that detects output torque To of automatic transmission 2.

<Kick-down Shift Control>

Kick-down shift control that is executed when automatic transmission 2 shown in FIG. 1 is downshifted to a low-side gear ratio in response to depression of the accelerator pedal (increase in the accelerator opening APO) during the above-described EV drive, is explained hereinafter.

The Kick-down shift includes, for instance, downshift from the second speed to the first speed which is carried out by changeover of the transmission friction elements, that is, by shifting high and low reverse clutch H&LR/C from the release state to the engagement state and shifting direct clutch D/C from the engagement state to the release state as indicated by arrows in FIG. 2.

Upon carrying out the downshift, high and low reverse clutch H&LR/C acts as an engagement element, and direct clutch D/C acts as a release element.

The kick-down shift of automatic transmission 2 is executed by transmission controller 24 as described above. However, when the kick-down shift is carried out during the EV drive, integrated controller 11 executes a control program as shown in FIG. 3 and sets an upper limit of target motor/generator torque tTm as follows, thereby realizing the kick-down shift control aimed by the present invention.

Figure 3:
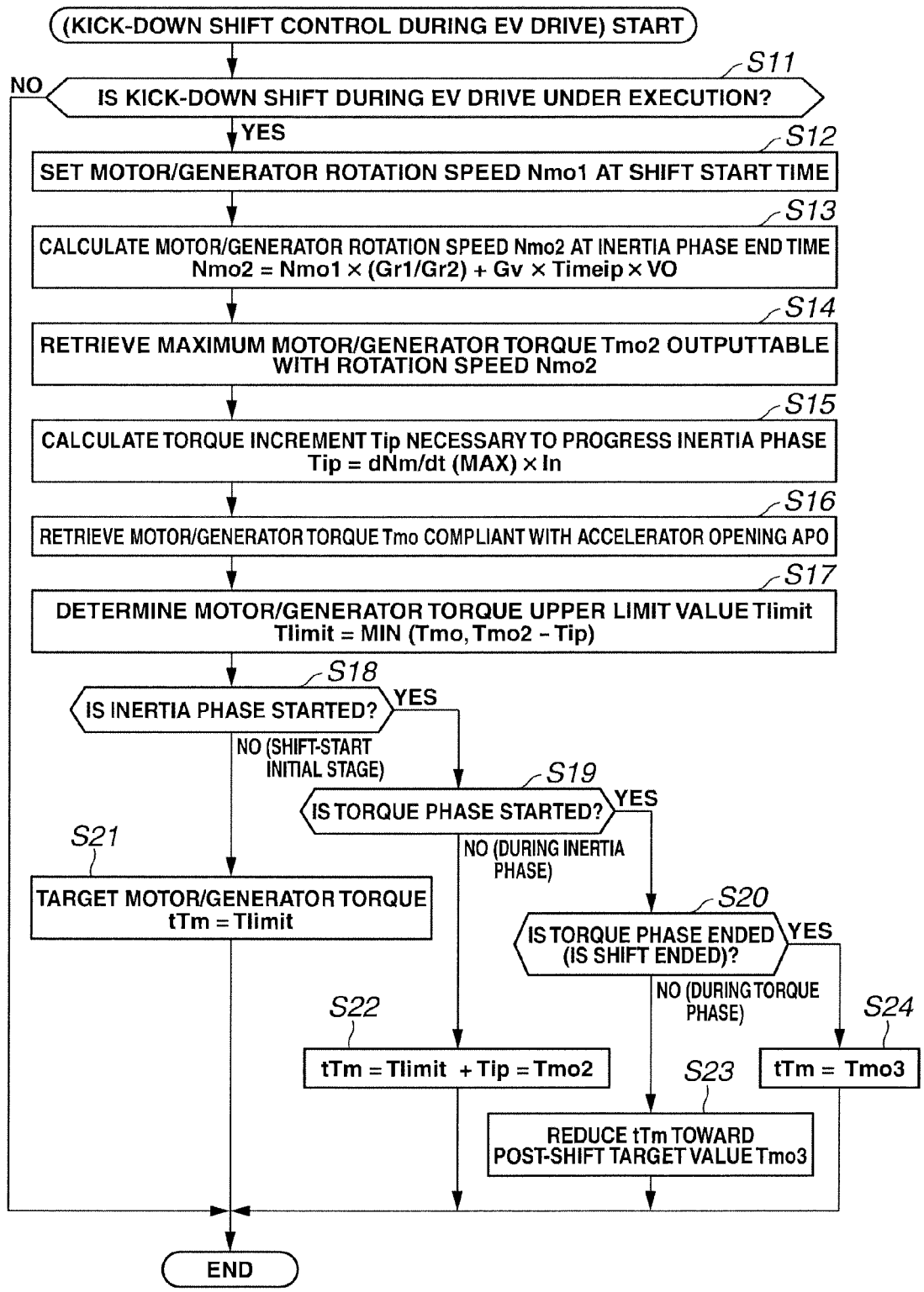
FIG. 3 is a flow chart showing a control program of kick-down shift control which is executed by an integrated controller.

In step S11 shown in FIG. 3, integrated controller 11 judges whether or not kick-down shift during the EV drive is under execution on the basis of information stored inside thereof and information from transmission controller 24.

If the kick-down shift during the EV drive is not under execution, indicating that the kick-down shift control aimed by the present invention is not necessary, then the control is immediately ended to escape from the loop of FIG. 3. If the kick-down shift during the EV drive is under execution, the control proceeds to step S12 in which the kick-down shift control (setting of an upper limit of the target motor/generator torque tTm) aimed by the present invention is executed as follows.

In step S12, motor/generator rotation speed Nm at a start time of the kick-down shift is set (stored) at Nmo1. In a case where the accelerator pedal is depressed such that the accelerator opening APO is increased from instant time t1 as shown in FIG. 4, the motor/generator rotation speed Nmo1 at a start time of the kick-down shift is the motor/generation rotation speed Nm at a shift judgment time (a shift start instant) t2 at which the accelerator opening APO becomes equal to or larger than a kick-down shift judgment value.

Figure 4:
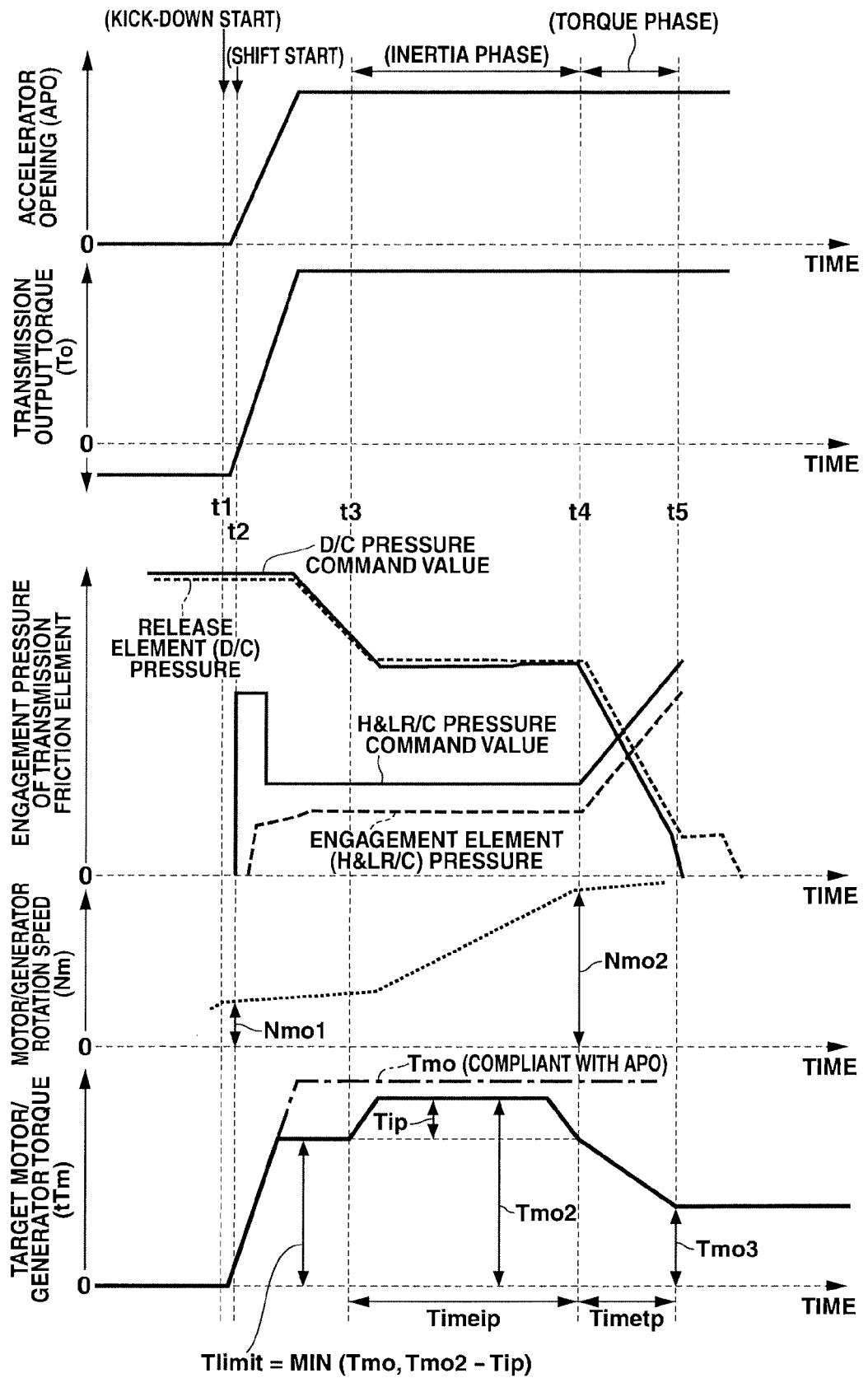
FIG. 4 is an operation timing chart of the kick-down shift control as shown in FIG. 3.

Further, FIG. 4 typically shows the case where automatic transmission 2 shown in FIG. 1 is downshifted from the second speed to the first speed (see arrows shown in FIG. 2) by shifting high and low reverse clutch H&LR/C as the engagement element from the release state to the engagement state due to increase in H&LR/C pressure shown in FIG. 4 and shifting direct clutch D/C as the release element from the engagement state to the release state due to drop of D/C pressure shown in FIG. 4.

In step S13 shown in FIG. 3, motor/generator rotation speed Nmo2 at instant t4 at which an inertia phase is ended is calculated by computation as explained below. The inertia phase is started from inertia phase start instant t3 and is ended at inertia phase end instant t4, in which input/output rotation speed ratio (Nm/No) of automatic transmission 2 is changing from a pre-shift (the second speed) gear ratio to a post-shift (the first speed) gear ratio.

Upon the calculation, the computation is performed according to the following expression: Nmo2=Nmo1×(Gr1/Gr2)+Gv×Timeip×VO using the motor/generator rotation speed Nmo1 at the shift start time which is stored in step S12, a step ratio (Gr1/Gr2) between the pre-shift (the second speed) gear ratio Gr2 and the post-shift (the first speed) gear ratio Gr1, the vehicle longitudinal acceleration Gv detected by sensor 20 (see FIG. 1), target time Timeip (see FIG. 4) from shift start (t2) to inertia phase end (t4), and motor/generator rotation speed change VO relative to unit vehicle speed change (1 km/h) at the first speed after the shift. As a result, the inertia phase end motor/generator rotation speed Nmo2 can be obtained as shown in FIG. 4.

Figure 5:
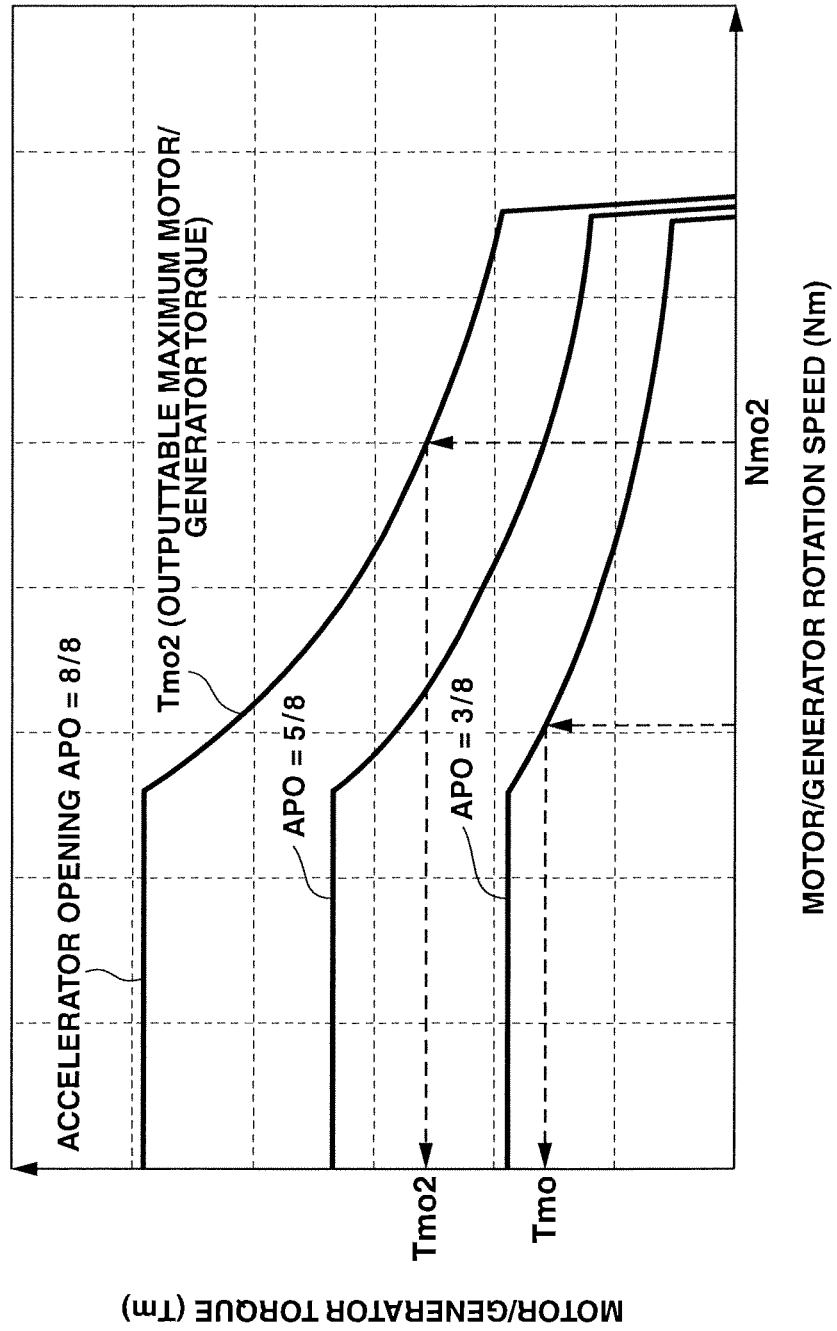
FIG. 5 is a characteristic curve diagram showing a characteristic of variation in motor torque relative to rotation speed of a motor/generator shown in FIG. 1 every accelerator opening APO (outputtable maximum torque in a full-open state, i.e., APO=8/8).

In next step S14, inertia phase end outputtable maximum motor/generator torque Tmo2 (also see FIG. 4) which is outputtable from motor/generator 3 with the motor/generator rotation speed Nmo2 is retrieved from a characteristic map of maximum torque of motor/generator 3 which can be outputted in an accelerator opening full-open state as shown in FIG. 5 (the characteristic map varies depending on the state of charge SOC of the battery and a condition of the motor control system including motor/generator 3) with respect to the inertia phase end motor/generator rotation speed Nmo2.

In next step S15, a torque increment Tip necessary to progress the inertia phase (an inertia phase progressing torque increment) is calculated.

Upon the calculation, the inertia phase progressing torque increment Tip can be obtained as shown in FIG. 4 according to the following expression: Tip=dNm/dt(MAX)×Im using maximum change rate dNm/dt(MAX) of motor/generator rotation speed Nm during the inertia phase, and rotational inertia Im relating to rotational change of motor/generator 3.

In next step S16, driver-requested accelerator-compliant motor/generator torque Tmo based on accelerator opening APO is obtained as indicated by dot and dash line in FIG. 4 by map-retrieval based on the predetermined map shown in FIG. 5, the accelerator opening APO and the motor/generator rotation speed Nm.

In next step S17, motor/generator torque upper limit value Tlimit upon the kick-down shift is determined as torque MIN (Tmo, Tmo2−Tip) which corresponds to a smaller one of differential torque (Tmo2−Tip) obtained by subtracting the inertia phase progressing torque increment Tip obtained in step S15 from the inertia phase end outputtable maximum motor torque Tmo2 obtained in step S14, and accelerator-compliant motor/generator torque Tmo obtained in step S16.

$$T\text{limit}=\text{MIN}(Tmo, Tmo2-Tip)$$

Subsequently, in step S18, step S19 and step S20, it is sequentially checked whether the shift is in a shift-start initial stage from the shift start instant t2 to the inertia phase start time t3 as shown in FIG. 4, whether the inertia phase from the instant t3 to the instant t4 is in progress, whether a torque phase from the inertia phase end time t4 to the instant t5 at which target torque phase time Timetp has elapsed is in progress, and whether the shift is in a post-shift state after an instant t5 at which the torque phase is ended (the shift is ended).

While it is judged in step S18 that the shift is in the shift-start initial stage, in step S21, the target motor/generator torque tTm is set at the kick-down shift motor/generator torque upper limit value Tlimit as indicated by solid line in FIG. 4, thereby restricting the target motor/generator torque tTm so as not to exceed the motor/generator torque upper limit value Tlimit.

While it is judged in step S19 that the inertia phase is in progress, in step S22, the target motor/generator torque tTm is set at an additional value (a value equal to the inertia phase end outputtable maximum motor/generator torque Tmo2) obtained by adding the inertia phase progressing torque increment Tip to the kick-down shift motor/generator torque upper limit value Tlimit as indicated by solid line in FIG. 4, thereby restricting the target motor/generator torque tTm so as not to exceed the additional value.

Accordingly, step S21 and step S22 correspond to a motor torque upper limit value restricting section of the present invention.

While it is judged in step S20 that the torque phase is in progress, in step S23, the target motor/generator torque tTm is gradually reduced so as to be equal to post-shift target value Tmo3 at the instant t5 at which the target torque phase time Timetp has elapsed as indicated by solid line in FIG. 4.

After it is judged in step S20 that the torque phase is ended (the shift is ended), in step S24, the target motor/generator torque tTm is set at the post-shift target value Tmo3 as indicated by solid line in FIG. 4.

<Effect of Kick-down Shift Control>

According to the kick-down shift control of the above-described embodiment, upon kick-down shift control of automatic transmission 2, in the shift initial stage from the shift start time t2 to the inertia phase start time t3 as shown in FIG. 4, the target motor/generator torque tTm that increases in compliance with depression of the accelerator pedal (increase in the accelerator opening APO) is restricted to the above-described upper limit value Tlimit=MIN(Tmo, Tmo2 - Tip) smaller than the accelerator opening-compliant value Tmo so as not to exceed the upper limit value Tlimit (step S21). During the inertia phase (t3-t4) as shown in FIG. 4, the target motor/generator torque tTm is restricted to a value of a sum of the above-described upper limit value Tlimit and the inertia phase progressing torque increment Tip (the sum value equal to the inertia phase end outputtable maximum motor/generator torque Tmo2) which is smaller than the accelerator opening-compliant value Tmo, so as not to exceed the sum value (step S22). As a result, the following effects can be obtained.

That is, according to the above-described kick-down shift control (setting of the upper limit of target motor/generator torque tTm), the upper limit value of the target motor/generator torque tTm that increases in compliance with depression of the accelerator pedal (increase in the accelerator opening APO) can be restricted to a level at which a phenomenon of drop of the motor/generator torque does not occur even when a rotation speed of motor/generator 3 is raised during the inertia phase as shown in FIG. 4 (irrespective of the motor/generator torque characteristic as shown in FIG. 5).

By thus suppressing the phenomenon of drop of the motor/generator torque during the inertia phase of the kick-down shift, the transmission output torque To also can be prevented from dropping as indicated by time series change shown in FIG. 4.

Therefore, during the inertia phase of the kick-down shift, the driver does not have such a complaint that a desired increase in vehicle acceleration is not attained.

Further, since the phenomenon of drop of the motor/generator torque does not occur during the inertia phase of the kick-down shift, a delay in progress of the kick-down shift (progress of the inertia phase) is not caused, so that the driver can be prevented from having a feeling of a large delay in shift response or a large delay in acceleration response.

In addition, the target motor/generator torque tTm is restricted to a value of a sum of the above-described upper limit value Tlimit and the inertia phase progressing torque increment Tip (the sum value equal to the inertia phase end outputtable maximum motor/generator torque Tmo2) during the inertia phase. As a result, progress of the inertia phase can be ensured to thereby make the above-described effects more remarkable.

Further, in this embodiment, the MIN(Tmo, Tmo2−Tip) as a smaller one of the differential torque (Tmo2−Tip) obtained by subtracting the inertia phase progressing torque increment Tip from the inertia phase end outputtable maximum motor torque Tmo2, and the accelerator-compliant motor/generator torque Tmo is determined as the kick-down shift motor/generator torque upper limit value Tlimit. With this construction, even in any configuration of the kick-down shift, the kick-down shift motor/generator torque upper limit value Tlimit can be an appropriate value without any excess and deficiency in order to attain the above-described effects. As a result, the vehicle can be prevented from coming into lack of acceleration due to excessive restriction of the motor/generator torque, and it is possible to avoid insufficient attainment of the above-described effects due to insufficient restriction of the motor/generator torque.

Further, the inertia phase end motor/generator rotation speed Nmo2 that is used upon obtaining the inertia phase end outputtable maximum motor/generator torque Tmo2 is preferably calculated by computation using the shift step ratio (Gr1/Gr2) between the pre-shift gear ratio Gr1 of the kick-down shift and the post-shift gear ratio Gr2 thereof and the longitudinal acceleration Gv of the vehicle as described about step S13 of FIG. 3. In such a case, the inertia phase end motor/generator rotation speed Nmo2 can be recognized even as a future value at the start time t2 of the kick-down shift, so that the above-described effects can be attained.

<Other Embodiments>

In the above-described embodiment, automatic transmission 2 is a stepwise automatic transmission. However, the concept of the present invention can be applied to a continuously variable transmission, particularly, a continuously variable transmission with manual mode.

The invention claimed is:

1. A kick-down shift control device for an electric vehicle, the electric vehicle being capable of travelling by motor torque inputted from an electric motor through an automatic transmission in compliance with an amount of depression of an accelerator pedal, the kick-down shift control device comprising:
    a controller that restricts an upper limit value of the motor torque increasing in compliance with depression of the accelerator pedal upon carrying out kick-down shift toward a low-side gear ratio of the automatic transmission in association with depression of the accelerator pedal by determining a rotation speed of the electric motor at a time at which an inertia phase, in which a ratio of input rotation speed of the automatic transmission and output rotation speed thereof is changed toward the low-side gear ratio, is ended and restricting the upper limit value of the motor torque to a level based on the determined rotation speed of the electric motor at a time at which the inertia phase is ended.

2. The kick-down shift control device for an electric vehicle as claimed in claim 1, wherein the upper limit value of the motor torque is determined based on outputtable maximum torque which is outputtable from the electric motor with the rotation speed of the electric motor at a time at which the inertia phase is ended.

3. The kick-down shift control device for an electric vehicle as claimed in claim 2, wherein the rotation speed of the electric motor at the time at which the inertia phase is ended is calculated by computation using a shift step ratio between a pre-shift gear ratio of the kick-down shift and a post-shift gear ratio of the kick-down shift and a longitudinal acceleration of the electric vehicle.

4. The kick-down shift control device for an electric vehicle as claimed in claim 2, wherein the upper limit value of the motor torque during a time from start of the kick-down shift to start of the inertia phase is a torque value smaller by an increment of inertia phase progressing torque necessary to progress the inertia phase than the outputtable maximum torque which is outputtable from the electric motor with the rotation speed of the electric motor at the time at which the inertia phase is ended.

5. The kick-down shift control device for an electric vehicle as claimed in claim 2, wherein the upper limit value of the motor torque during the inertia phase is the outputtable maximum torque which is outputtable from the electric motor with the rotation speed of the electric motor at the time at which the inertia phase is ended.

6. A kick-down shift control device for an electric vehicle, the electric vehicle being capable of travelling by motor torque inputted from an electric motor through an automatic transmission in compliance with an amount of depression of an accelerator pedal, the kick-down shift control device comprising:

a motor torque upper limit value restricting means for restricting an upper limit value of the motor torque increasing in compliance with depression of the accelerator pedal upon carrying out kick-down shift toward a low-side gear ratio of the automatic transmission in association with depression of the accelerator pedal, the motor torque upper limit value restricting means determining a rotation speed of the electric motor at a time in which an inertia phase, in which a ratio of input rotation speed of the automatic transmission and output rotation speed thereof is changed toward the low-side gear ratio, is ended and restricting the upper limit value of the motor torque to a level based on the determined rotation speed of the electric motor at a time at which the inertia phase is ended.

* * * * *